United States Patent [19]
Anderson

[11] Patent Number: 5,430,549
[45] Date of Patent: Jul. 4, 1995

[54] LASER POSITIONING DEVICE PRODUCING MULTIPLE PARALLEL LASER BEAMS

[76] Inventor: Nigel I. Anderson, Unit A, Lanzerac Estate, Old Pretoria Road, Halfway House, Transvaal, South Africa

[21] Appl. No.: 26,157

[22] Filed: Mar. 3, 1993

[51] Int. Cl.[6] .................... G01C 3/00; G01B 11/26
[52] U.S. Cl. ................................ 356/399; 356/3.11
[58] Field of Search ................ 356/399, 4, 5, 1

[56] References Cited

U.S. PATENT DOCUMENTS

| | | | |
|---|---|---|---|
| 4,307,408 | 12/1981 | Kiyuhara et al. | 346/76 L |
| 4,895,440 | 1/1990 | Cain et al. | 356/5 |
| 5,000,564 | 3/1991 | Ake | 356/1 |

FOREIGN PATENT DOCUMENTS

| | | | |
|---|---|---|---|
| 0194379 | 9/1986 | European Pat. Off. | |
| 909993 | 6/1946 | France | |
| 532253 | 1/1941 | United Kingdom | |

OTHER PUBLICATIONS

Applied Optics, vol. 30, No. 12, 20 Apr. 1991, New York, NY, USA; p. 1420 Ping Tcheng, T. D. Shott 'Electrooptical Position Measuring System'.
ETM Laser Technik, "Laser Measuring Technology Aligning and Positioning", unknown date.

*Primary Examiner*—Rolf Hille
*Assistant Examiner*—Alexander Oscar Williams
*Attorney, Agent, or Firm*—Popham, Haik, Schnobrich & Kaufman, Ltd.

[57] ABSTRACT

The laser positioning device (10) as a housing (12) and a number of individual diode lasers (18) accommodated in the housing. The diode lasers can be energized to produce individual laser beams. Beam fanning means, preferably in the form of tubular lenses (28), are used to fan the laser beams to produce parallel, fanned beams (65) which are then projected from the housing (12) through a window (58). The positions of at least some of the diode lasers in the housing are adjustable by means of an endless cable and pulley mechanisms.

12 Claims, 3 Drawing Sheets

LASER POSITIONING DEVICE PRODUCING MULTIPLE PARALLEL LASER BEAMS

BACKGROUND TO THE INVENTION

This invention relates to a laser positioning device.

There are a number of manufacturing and other activities where it is necessary to place the constituent parts of items being manufactured correctly and accurately relative to one another for assembly purposes. One example is in the rubber tire manufacturing industry, where components such as canvas and rubber strips steel belts and so on have to be positioned accurately relative to the tire carcase during the assembly process.

Conventionally, accurate component positioning can be achieved in a number of different ways. For instance, adjustable mechanical pointers can be set up to indicate the lines along which components should be fed. However, the mechanical systems suffer from disadvantages such as the fact that they are cumbersome and bulky, with the potential for obstructing the free movement of personnel responsible for handling and positioning the components.

A known system already used in the tire manufacturing industry employs a light projector to project thin slits of light onto the tire. The slits of light then serve as indicators for component positioning. Practical disadvantages of such systems include the fact that the projector lamp consumes considerable energy and produces a great deal of heat. Added to this, the lines of light are not easily visible in some lighting conditions.

SUMMARY OF THE INVENTION

The present invention provides a laser positioning device comprising a housing, a plurality of individual diode lasers accommodated in the housing, the diode lasers being actuable to produce individual laser beams, beam fanning means acting to fan the laser beams to produce parallel, fanned laser beams, window means through which the fanned laser beams are projected from the housing, and adjustment means for adjusting, individually, the positions of at least some of the diode lasers in the housing.

Conveniently, the beam fanning means comprises at least one lens of tubular cylindrical shape. There may be a lens of tubular cylindrical shape for each diode laser. Also, the device may include a further diode laser actuable to produce a further laser beam, and further beam fanning means, once again preferably of tubular cylindrical form, acting to fan the further laser beam in a plane transverse to the planes of the first-mentioned, parallel, fanned laser beams.

The adjustment means may comprise, for each adjustable diode laser, an endless cable to which the diode laser is attached, drive and idler pulleys about which the cable passes, and an operating knob for rotating the drive pulley, thereby to move the cable and, with it, the diode laser. Preferably there is at least one drive pulley spindle with a plurality of drive pulleys mounted rotatably thereon and a plurality of individual operating knobs for independently rotating the drive pulleys on the spindle.

Preferably also, the drive pulleys on the drive pulley spindle are carried by sleeves which are arranged concentrically about the spindle, the individual operating knobs being connected to the respective sleeves. In the interests of further compactness, the drive pulley spindle can also have a plurality of idler pulleys mounted rotatably thereon.

The device conveniently has a base on which the housing is pivotally mounted. The base may carry a graduated scale.

The invention extends to a laser positioning device operable to produce a plurality of individually adjustable, parallel, fanned laser beams, the device comprising at least one lens of tubular cylindrical shape to fan the laser beams.

The invention also extends to a method of producing a fanned laser beam which comprises the step of passing a collimated laser beam through a lens which is of tubular cylindrical shape.

BRIEF DESCRIPTION OF THE DRAWINGS

The invention will now be described in more detail, by way of example only, with reference to the accompanying drawings in which.

DESCRIPTION OF PREFERRED EMBODIMENTS

Figure 1:
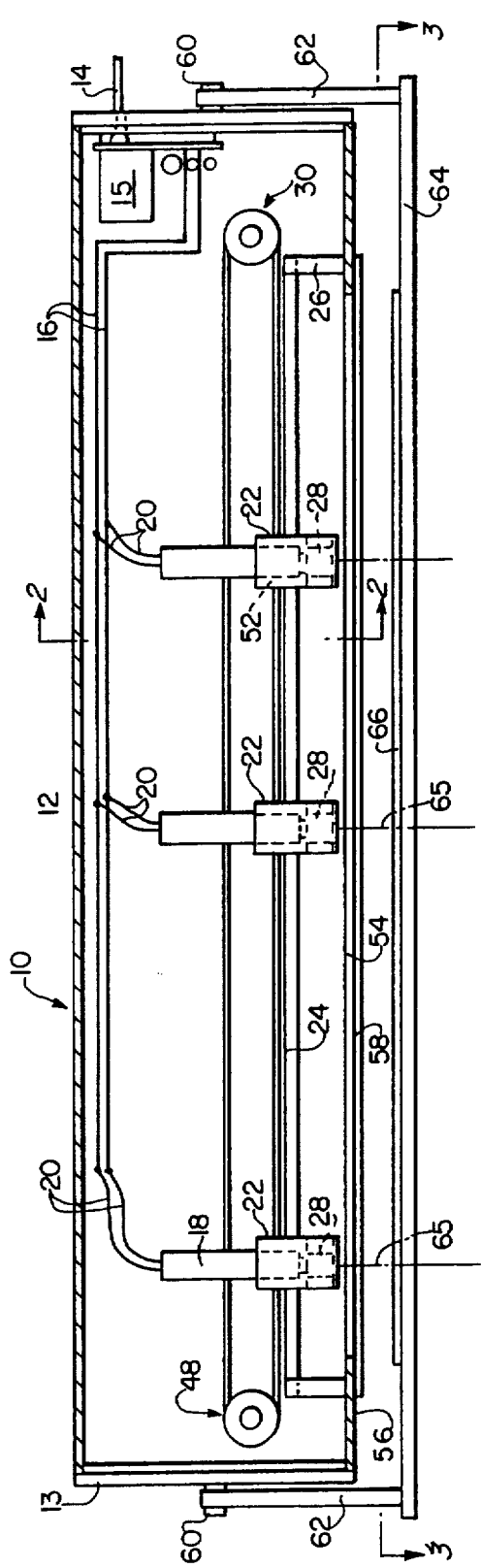
FIG. 1 shows a sectional plan view illustrating the internal components of a laser positioning device of the invention.

FIGS. 1 to 4 illustrate a laser positioning device 10 of the invention. The illustrated laser positioning device is suitable for use in the tire manufacturing industry to facilitate accurate positioning of various tire components during tire assembly.

The device 10 has an elongate housing 12 which is of rectangular cross-section and which has end caps 13. Located at one end of the housing is a power supply unit 15 which is supplied with electrical power by a cable 14 extending from a mains or other supply. The unit 15 outputs current along output supply conductors 16 extending along the length of the housing 12. In place of an externally powered unit, there may be a DC battery pack in the housing 12.

Located in the housing 12 are three diode laser modules 18. In the illustrated case, each module 18 is a commercially available unit incorporating a small diode laser, a simple collimating lens system and appropriate power electronics to power the diode laser. The modules 18 are connected to the supply conductors 16 by means of flexible leads 20 which can extend to allow for the required movements of the modules as described below. When energized the diode laser modules produce collimated beams of laser light. The collimated beams may be cylindrical or elliptical in cross-section with small lateral dimensions.

Figure 2:
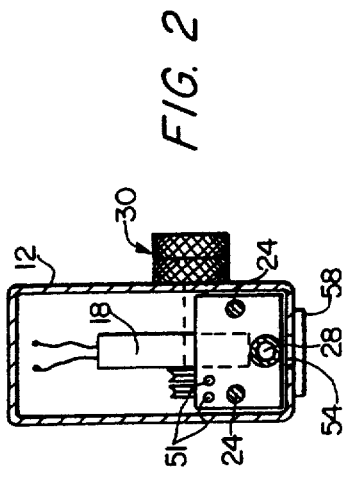
FIG. 2 shows a cross-section at the line 2—2 in FIG. 1.
Figure 3:
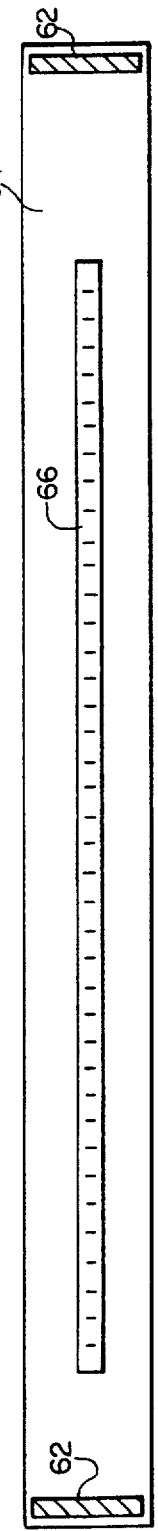
FIG. 3 shows a cross-section at the line 3—3 in FIG. 1.
Figure 4:
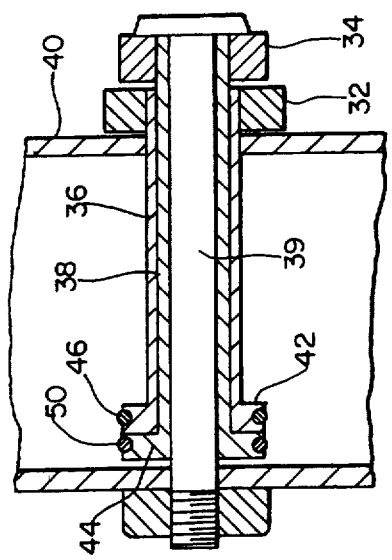
FIG. 4 shows a detail of the rotary knob adjustment system used in the device of the preceding Figures.

The diode laser modules 18 are mounted on carriages 22. The outer carriages 22 are mounted for sliding movement on guide rails 24 which pass through the carriages, as seen in FIG. 2, and which are supported on posts 26 towards the ends of the housing 12. The middle carriage is anchored on the guide rails and is located at a central point along the length of the housing 12.

Each carriage 22 carries a lens 28 of tubular cylindrical configuration. More is said below about the lenses 28. In the illustrated case, the lens axes are parallel to the length of the housing 12.

Towards one end of the housing is a drive pulley arrangement designated generally with the numeral 30. The pulley arrangement has inner and outer knurled knobs 32 and 34 (FIG. 4) mounted fast on respective outer and inner tubular sleeves 36 and 38 which are located rotatably on a fixed spindle 39 that passes through the wall 40 of the housing 12. Pulleys 42 and 44 are mounted fast on the ends of the sleeves 36 and 38 inside the housing as illustrated.

A first endless cable 46 passes around the pulley 42 and around a corresponding idler pulley located at a pulley station 48 at the opposite end of the housing 12. In similar fashion, a second endless cable 50 passes around the pulley 44 and around another idler pulley at the pulley station 48. Only one of the idler pulleys is visible in FIG. 1.

It will be noted in FIG. 2 that the cables 46 and 50 pass through openings 51 formed in the carriages 22. The outer carriages are secured to the respective pulley cables 46 and 50. This can be achieved by grub screws, one of which is indicated diagrammatically at 52 in FIG. 1, which apply a pinching action to the cables, or by any other suitable means.

With the arrangement of pulleys, cables and carriages as described above, it will be appreciated that rotation of a knurled knob 32 or 34 will result in rotation of the relevant driving pulley 42 or 44 and accordingly in longitudinal movement of the cable 46 or 50 and of the associated carriage 22 and diode laser module 18. Thus the outer modules 18 can be made to move back and forth to selected longitudinal positions by appropriate manipulation of the relevant knob 32 or 34.

An elongate slot 54 is formed in a forward facing wall 56 of the housing 12, and a window 58, transparent to laser light, is located over the slot. The laser modules 18 are directed at the slot and window.

The housing 12 is support pivotally on trunnions 60 extending from arms 62 on a mounting plate 64 which carries a graduated scale 66. In practice, the plate 64 can be secured by appropriate fixing means such as bolts or screws to a supporting structure, with the device then being pivotable about the axis of the trunnions 60.

In operation, with the laser modules energized, thin beams of laser light are produced by the modules and are directed at the tubular lenses 28. The tubular lenses fan out the laser beams into parallel lines of light 65 which are projected out of the device through the window 58. In a typical tire manufacturing application where the lines of light act are used to ensure accuracy in component positioning on the tire carcase, the lines will usually be in parallel vertical planes, with the trunnion axis horizontal.

It will be appreciated that knobs 32 and 34 can be manipulated to adjust the positions of the lines 65 of laser light produced by the outer laser modules. If required in a particular application, suitable locking mechanisms can be provided to lock the carriages 22, and hence the laser modules 18, in place once they have been brought to the correct positions by appropriate manipulation of the knobs 32 and 34. A suitable locking system is described below in connection with FIG. 5.

Correct initial setting of the laser modules can be achieved by pivoting the housing 12 on the trunnions 60 so that the lines of laser light impinge on the graduated scale 66. The knobs 32, 34 are then manipulated to bring the lines of laser light to the correct, predetermined positions on the scale 66. The housing 12 can then be pivoted back again on the trunnions 60 to the appropriate orientation for component positioning.

In FIGS. 1 to 4, there are two adjustable laser modules and a single, fixed-position laser module. In this case, all the laser modules produce parallel fanned beams of laser light, typically in vertical planes. In other cases, it may also be desirable to have a horizontal line of laser light, perhaps intersecting the vertical lines. In such cases, a further laser module can be incorporated with a tubular lens arranged to fan the collimated beam of laser light in a plane at right angles to the planes in which the laser beams from the other laser modules are fanned.

Figure 5:
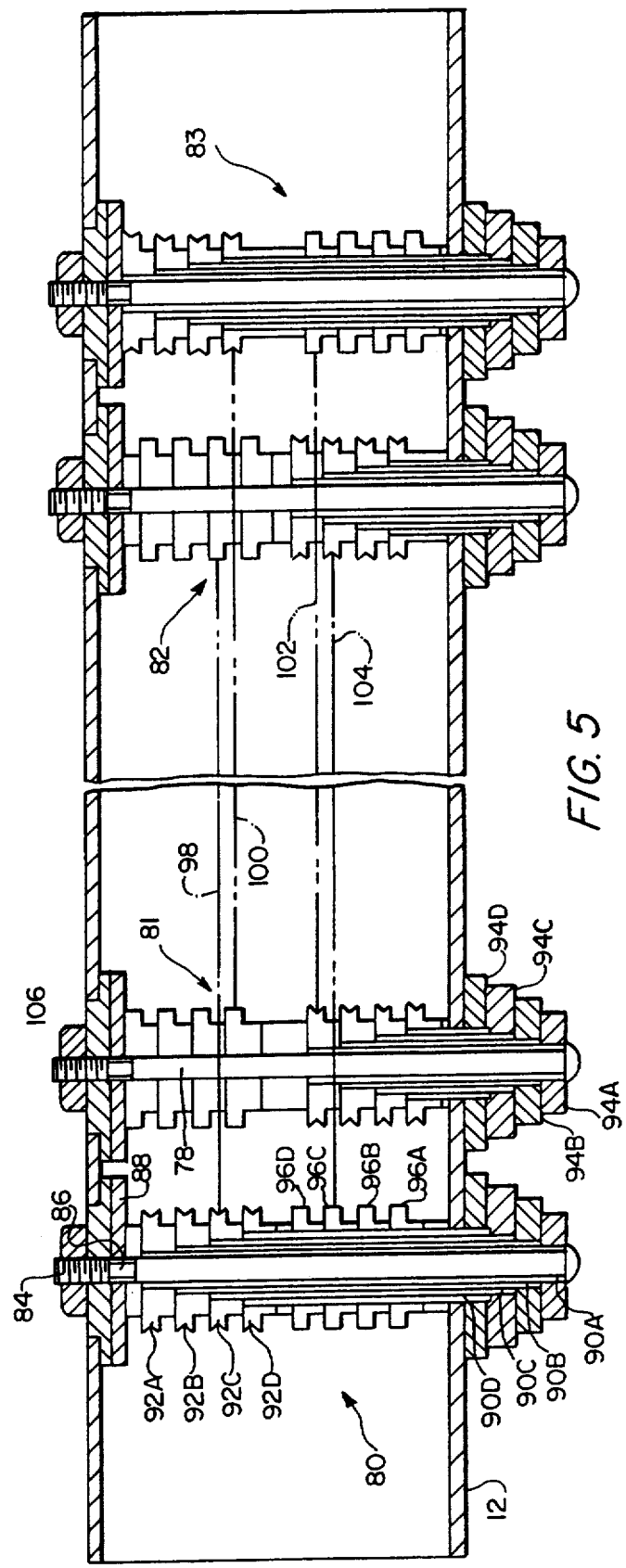
FIG. 5 illustrates a corresponding rotary knob adjustment system to be used in a laser positioning device of the invention with a much greater number of individual lasers.

Also, certain applications may require a substantially greater number of lines of light. FIG. 5 illustrates a device according to the invention which incorporates sixteen adjustable laser modules. In the interests of clarity in this Figure, only the housing 12 and pulley arrangements are illustrated.

In FIG. 5 there are four pulley units 80, 81, 82 and 83. Each pulley unit has a non-rotatable spindle 78 passing right through the opposite walls of the housing 12. One end of the spindle is threaded as illustrated at 84.

The spindle is rendered non-rotatable by virtue of a flat 86 on the surface of the spindle which is engaged by a key 88 fixed relative to the housing wall. Located concentrically about the spindle 82 are four sleeves 90A to 90D carrying respective drive pulleys 92A to 92D inside the housing 12. Respective knurled knobs 94A to 94D of different diameter facilitating hand access are mounted on the sleeves. In addition to the drive pulleys 92A to 92D, there are four idler pulleys 96A to 96D which are all rotatably mounted relative to the spindle.

The broken line 98 indicates a typical endless cable that passes around a drive pulley, in this case the pulley 92C, and around an aligned idler pulley of the pulley units 82. In similar fashion, it will be seen that other endless cables 100, 102 and pass around a drive pulley of one of the pulley units and around an aligned idler pulley on another of the pulley units. The end result is a total of sixteen endless cables which are independent of one another. As in the embodiment of FIGS. 1 to 4, each cable is secured to a laser module carriage, so that appropriate manipulation of the relevant knurled knobs causes corresponding longitudinal movement of the laser modules.

It will be noted in FIG. 5 that a nut 106 is provided on the threaded end of each spindle. In practice, when the laser modules have been brought to the correct positions for a particular component positioning system, the various pulleys can be locked in position merely by tightening up the nuts 106. This has the effect of pulling the knurled knobs into tight frictional engagement with one another, thereby to prevent further rotation of the knobs.

This type of pulley locking system can also be used in the embodiment of FIGS. 1 to 4.

A major advantage of the pulley arrangements described above is the compactness thereof arising from the mounting of plural pulleys on common spindles. In a practical application there may also be one or more fixed laser modules in addition to the sixteen adjustable modules. As in the first embodiment, the fixed laser module will generally be centrally located.

It will be appreciated that with other spindle configurations more or less than sixteen adjustable laser modules can be incorporated in the device. As mentioned above, a laser module adapted to produce a horizontally fanned beam of laser light can also be included if required in a particular application.

Another major advantage of the invention arises from the use of tubular lenses to fan the collimated laser beams produced by the diode lasers. Conventional cylindrical lenses will typically produce fan angles of 5° or less, while conventional solid rod lenses will typically produce fan angles in the range 30° to 120° or more. Thus in the one case, a relatively short, high intensity line of laser light is produced, while in the other case a very long, low intensity line of laser light is produced. Problems arise where fan angles between these extremes are required, as will typically be the case in a component positioning application such as in the tire manufacturing industry.

After extensive experimentation the present inventor has found that glass tubing can be used to good effect to produce a wide range of different fan angles, from less than 1° to more than 35°, to suit particular applications. In each case, the fan angle varies with varying tube wall thickness and tube diameter in relation to the lateral dimensions of the incident collimated laser beam.

If extremely accurate fan angles are to be achieved, it is preferable to employ a tubular lens with precision ground inner and outer surfaces. The inventor has nevertheless ascertained that standard grade glass tubing of appropriate wall thickness and diameter can be used to good effect in situations where great accuracy in the fan angle is not critical. Clearly if standard grade tubing is used, the overall costs of the laser positioning device can be reduced.

While the illustrated embodiments make use of individual tubular lenses to fan the laser beams, it should be noted that it is within the scope of the invention for all the parallel laser beams to be fanned by a single tubular lens of sufficient length and extending along the housing in front of the window.

It is also possible for tubular lenses to be used to fan only some of the laser beams, with conventional cylindrical or rod lenses used to fan others of the beams. A rod lens may be preferred to produce a fanned beam in the horizontal plane, since a rod lens will in general produce a greater fan angle and hence a longer horizontal line of light.

Figure 7:
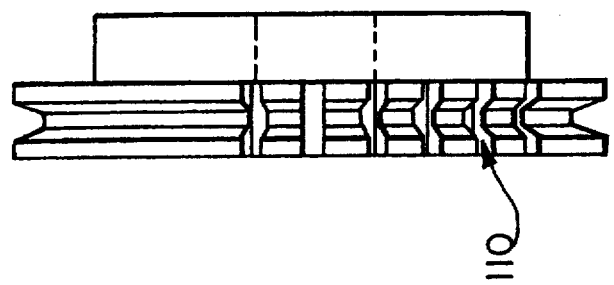
FIG. 7 shows an end view of the modified drive pulley wheel.
Figure 6:
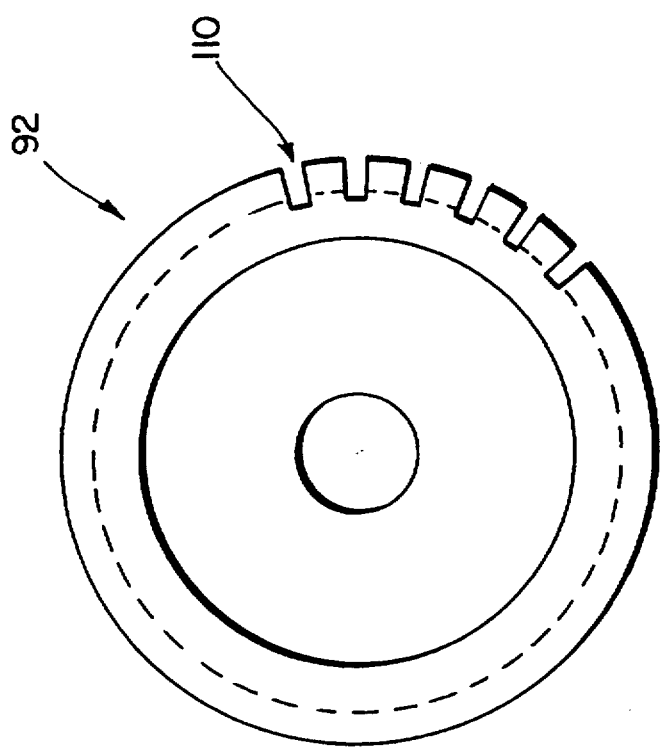
FIG. 6 shows a side view of a modified drive pulley wheel.

FIGS. 6 and 7 illustrate a drive pulley wheel in which transverse cuts 110 have been formed across the pulley tread. The sharp edges of the cuts increase the friction between the pulley and the cable and thereby reduce the chances of cable slippage and the possibility of inaccurate laser module positioning. It should also be noted that the cables used in the illustrated embodiments could take the form of non-slip belts or other elongate, flexible members.

I claim:
1. A laser positioning device, comprising:
a housing;
a plurality of individual first diode lasers positioned within the housing, the first diode lasers each generating an individual first laser beam;
beam fanning means for fanning the individual first laser beams to produce first parallel, fanned laser beams, said beam fanning means being located in the housing;
a window defined on the housing through which the first fanned laser beams are projected from the housing; and
adjusting means for adjusting, individually, positions of at least one of the first diode lasers in the housing.

2. A laser position device according to claim 1, wherein the first beam fanning means comprises at least one lens of tubular cylindrical shape.

3. A laser position device according to claim 2, wherein said first beam fanning means further comprises individual lenses of tubular cylindrical shape for at least one of the first diode lasers.

4. A laser position device according to claim 1, further comprising a second diode laser for producing a second laser beam, and second beam fanning mens for fanning second the laser beam transverse to the first parallel, fanned laser beams.

5. A laser position device according to claim 4, wherein the second beam fanning means comprises a lens of tubular cylindrical shape.

6. A laser position device according to claim 1, wherein the adjusting means comprises, for each said first diode laser that may be adjusted, an endless cable to which the first diode laser is attached, drive and idler pulleys about which the cable passes, and an operating knob for rotating the drive pulley, thereby to move the cable and, with it, the first diode laser.

7. A laser positioning device according to claim 6, comprising at least one drive pulley spindle with a plurality of drive pulleys mounted rotatably thereon and a plurality of individual operating knobs for independently rotating the drive pulleys on the spindle.

8. A laser positioning device according to claim 7, wherein the drive pulleys on the drive pulley spindle are carried by sleeves which are arranged concentrically about the spindle, the individual operating knobs being connected to respective sleeves.

9. A laser positioning device according to claim 8, wherein the drive pulley spindle also has a plurality of idler pulleys mounted rotatably thereon.

10. A laser positioning device according to claim 1, further comprising a base on which the housing is pivotally mounted.

11. A laser positioning device according to claim 10, further comprising a graduated scale on the base.

12. A laser positioning device according to claim 1, wherein said adjusting means includes means for varying spacing between the first diode lasers such that the first parallel, fanned laser beams remain parallel to each other.

* * * * *